United States Patent
Dwelley

(10) Patent No.: US 6,307,356 B1
(45) Date of Patent: *Oct. 23, 2001

(54) VOLTAGE MODE FEEDBACK BURST MODE CIRCUIT

(75) Inventor: David M. Dwelley, Fremont, CA (US)

(73) Assignee: Linear Technology Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/099,409

(22) Filed: Jun. 18, 1998

(51) Int. Cl.[7] .................................................. G05F 1/40
(52) U.S. Cl. ................................... 323/282; 323/283
(58) Field of Search .................................. 323/222, 225, 323/282, 283, 284; 363/39, 40, 41

(56) References Cited

U.S. PATENT DOCUMENTS

| 3,458,798 | 7/1969 | Fang et al. . |
| 3,571,697 | 3/1971 | Phillips . |
| 3,579,091 | 5/1971 | Clarke et al. . |

(List continued on next page.)

FOREIGN PATENT DOCUMENTS

| 0 428 377 A2 | 5/1991 | (EP) . |
| 60-32565 | 2/1985 | (JP) . |
| 59-11459 | 8/1985 | (JP) . |
| 60-156269 | 8/1985 | (JP) . |
| 63-307510 | 12/1988 | (JP) . |
| 3-113986 | 11/1991 | (JP) . |
| 2-146080 | 2/1992 | (JP) . |
| 4-42771 | 2/1992 | (JP) . |
| 4-49844 | 2/1992 | (JP) . |
| 4-101286 | 9/1992 | (JP) . |
| 4-128086 | 11/1992 | (JP) . |

OTHER PUBLICATIONS

Y.S. Lee and Y.C. Cheng, "Design of Switching Regulator with Combined FM and On–Off Control," *IEEE Transactions on Aerospace and Electronic Systems,* vol. AES–22, No. 6, Nov. 1986, pp. 725 to 731.

Jim Williams and Brian Huffman, "Some Thoughts on DC–DC Converters," Linear Technology Application Note #29, Oct. 1988, pp. AN29–1 to AN29–39.

Jim Williams, "Step Down Switching Regulators," Linear Technology Application Note #35, Aug. 1989, pp. AN35–1 to AN35–32.

Paul D. Gracie, "Intermittent Converter Saves Power," EDN Magazine Edition, Sep. 1, 1989, p. 151.

(List continued on next page.)

*Primary Examiner*—Jessica Han
(74) *Attorney, Agent, or Firm*—Fish & Neave; Robert W. Morris; Joel Weiss

(57) ABSTRACT

A voltage-mode feedback switching regulator circuit capable of automatically entering and exiting burst mode is provided. When the load current is low, the switching regulator utilizes a fixed minimum non-zero duty cycle generator to override a pulse-width modulator generator and provide a minimum ON-cycle to a power switch in the switching regulator. This drives the required duty cycle generated by the pulse-width modulator lower. When the pulse-width modulator is driven so low that it requires a zero duty cycle, digital logic, which has been receiving the duty cycle of the pulse-width modulator, commands the switching regulator to enter burst mode and shut down. This principle can be utilized in either a non-synchronous or synchronous switching regulator with small modifications. In addition, the principle can be utilized for both step-down and step-up configurations.

22 Claims, 10 Drawing Sheets

U.S. PATENT DOCUMENTS

| | | |
|---|---|---|
| 3,581,186 | 5/1971 | Weinberger . |
| 3,582,758 | 6/1971 | Gunn . |
| 3,585,491 | 6/1971 | Petersen . |
| 3,733,540 | 5/1973 | Hawkins . |
| 3,772,588 | 11/1973 | Kelly et al. . |
| 3,784,893 | 1/1974 | Rando . |
| 3,863,128 | 1/1975 | Wilwerding . |
| 3,879,647 | 4/1975 | Hamilton et al. . |
| 3,992,638 | 11/1976 | Sauvanet . |
| 4,013,939 | 3/1977 | Biess et al. . |
| 4,035,710 | 7/1977 | Joyce . |
| 4,071,884 | 1/1978 | Maigret . |
| 4,160,288 | 7/1979 | Stuart et al. . |
| 4,326,245 | 4/1982 | Saleh . |
| 4,395,675 | 7/1983 | Toumani . |
| 4,428,015 | 1/1984 | Nesler . |
| 4,462,069 | 7/1984 | Becky . |
| 4,479,174 | 10/1984 | Cates . |
| 4,493,017 | 1/1985 | Kammiller et al. . |
| 4,519,024 | 5/1985 | Federico et al. . |
| 4,541,041 | 9/1985 | Park et al. . |
| 4,542,041 | 9/1985 | Park et al. ............................ 363/41 |
| 4,554,499 | 11/1985 | Sherman et al. . |
| 4,578,630 | 3/1986 | Grosch . |
| 4,610,521 | 9/1986 | Inoue . |
| 4,634,956 | 1/1987 | Davis et al. . |
| 4,672,303 | 6/1987 | Newton . |
| 4,672,518 | 6/1987 | Murdock . |
| 4,674,020 | 6/1987 | Hill . |
| 4,683,529 | 7/1987 | Bucher, II . |
| 4,706,177 | 11/1987 | Josephson . |
| 4,709,315 | 11/1987 | Ramos . |
| 4,712,169 | 12/1987 | Albach . |
| 4,716,514 | 12/1987 | Patel . |
| 4,727,308 | 2/1988 | Huljak et al. . |
| 4,754,385 | 6/1988 | McDade et al. . |
| 4,801,859 | 1/1989 | Dishner . |
| 4,813,066 | 3/1989 | Holtz et al. . |
| 4,814,684 | 3/1989 | McCurdy . |
| 4,819,122 | 4/1989 | Gontowski, Jr. . |
| 4,823,070 | 4/1989 | Nelson . |
| 4,843,532 | 6/1989 | Freedman . |
| 4,866,587 | 9/1989 | Wadlington . |
| 4,870,555 | 9/1989 | White . |
| 4,884,183 | 11/1989 | Sable ...................................... 363/41 |
| 4,902,957 | 2/1990 | Cassani et al. ...................... 323/222 |
| 4,922,404 | 5/1990 | Ludwig et al. . |
| 4,928,200 | 5/1990 | Redl et al. . |
| 4,929,882 | 5/1990 | Szepesi . |
| 4,931,716 | 6/1990 | Jovanovic et al. . |
| 4,996,638 | 2/1991 | Orr . |
| 5,028,861 | 7/1991 | Pace et al. ........................... 323/222 |
| 5,034,871 | 7/1991 | Okamoto et al. . |
| 5,066,900 | 11/1991 | Bassett . |
| 5,068,575 | 11/1991 | Dunsmore et al. . |
| 5,081,411 | 1/1992 | Walker . |
| 5,097,196 | 3/1992 | Schoneman . |
| 5,128,603 | 7/1992 | Wölfel . |
| 5,134,355 | 7/1992 | Hastings et al. . |
| 5,138,249 | 8/1992 | Capel . |
| 5,144,547 | 9/1992 | Masamoto . |
| 5,170,333 | 12/1992 | Niwayama . |
| 5,177,676 | 1/1993 | Inam et al. . |
| 5,179,511 | 1/1993 | Troyk et al. . |
| 5,184,129 | 2/1993 | Fung et al. . |
| 5,193,211 | 3/1993 | Nobusawa . |
| 5,237,606 | 8/1993 | Ziermann . |
| 5,309,078 | 5/1994 | Cameron ............................ 318/811 |
| 5,396,412 | 3/1995 | Barlage . |
| 5,408,162 | 4/1995 | Williams . |
| 5,469,349 | * 11/1995 | Marinus .............................. 363/41 X |
| 5,481,178 | 1/1996 | Wilcox et al. ....................... 323/287 |
| 5,528,483 | * 6/1996 | Mohandes ............................. 363/21 |
| 5,548,189 | 8/1996 | Williams . |
| 5,568,044 | * 10/1996 | Bittner ................................ 323/272 |
| 5,627,460 | 5/1997 | Bazinet et al. . |
| 5,747,976 | * 5/1998 | Wong et al. ......................... 323/282 |
| 5,804,950 | * 9/1998 | Hwang et al. ....................... 323/222 |

OTHER PUBLICATIONS

Cassani et al., "Sophisticated Control IC Enhances 1MHz Current Controlled Regulator Performance," High Frequency Power Conversion 1992, May 1992 Proceedings, pp. 167 to 173.

Maxim Integrated Products Data Book, "Triple–Output Power–Supply Controller for Notebook Computers," 19–0045, Revision 1; May 1994, pp. 1 to 28.

Williams, J. and Huffman, B., "Proper instrumentation eases low power dc/dc converter design," EDN, Oct. 27, 1988.

Chryssis, George, "High–frequency Switching Power Supplies," pp. 144–152 and 180–181, McGraw–Hill, 1989.

Hnatek, Eugene R., "Design of Solid State Power Supplies," Third Edition, pp. 65–70, Van Nostrand Reinhold, 1989.

Linear Technology, "LT1846/1847, LT3846/3847 Current Mode PWM Controller," Datasheet, 1990.

Huffman, B., "Efficiency and Power Characteristics of Switching Regulator Circuits," Application Note 46, Linear Technology, Nov. 1991.

Gold, S., "Design Techniques for Electrostatic Discharge Protection," Linear Technology, Oct. 1992.

Uitrode, "UC1846/7, UC2846/7, UC38467 Current Mode PWM Controller," Datasheet, dated Jan. 1997 (date of first publication unknown).

Analog Devices, Inc., "High Efficiency Synchronous Step–Down Switching Regulators ADP1148, ADP1148–3.3, ADP 1148–5," Analog Devices, pp. 1–14, 1997.

Archer, William R., "Current Drives Synchronous Rectifier," EDN, Nov. 28, 1985.

Archer, William R., "Current–Driven Synchronous Rectifier," Motorola TMOS Power FET Design Ideas, BR316, pp. 9–10, 1985.

Blanchard, Richard, et al., "MOSFETs, Schottky Diodes Vie for Low–Voltage–Supply Designs," EDN, p. 197, Jun. 28, 1984.

Borghi et al., "Discontinuous Conduction Mode Power Switching Regulator IC," PCI Oct. 1988 Proceedings, pp. 31–41, Oct. 1988.

Brown, Marty, "Practical Switching Power Supply Design," pp. 20–34, Academic Press, Inc., 1990.

Business Wire, "Micro Linear announces first single–chip power controller for notebook computers," Apr. 15, 1992.

Cassani, John, C.; Hodgins, Jonathan J.; Robert G. and Wittlinger, H.A., "Sophisticated Control IC Enhances 1 MHZ Current Controlled Regulator Performance," Proceedings of HFPC, pp. 167–173, May 1992.

Chetty, P.R., "DC timers control dc–dc converters" Electronics, pp. 121 & 123, Nov. 13, 1975.

Chryssis, George,High–Frequency Switching Power Supplies, pp. 144–152, 180–81, 1989.

Dell Computer Corporation, "Dell Computer Corporation Introduces Advanced Notebook PC," (alleged to contain UC1895 (see Unitrode Advance Information Datasheet, Oct. 5, 1992), Sep. 1991.

Dinsmore, D., "Dual regulator handles two input voltages," EDN, Jan. 21, 1993.

Fisher, R. A. et al., "Performance of Low Loss Synchronous Rectifiers in a Series–Parallel Resonant DC–DC Converter," Proceedings of the Fourth Annual IEEE Applied Power Electronics Conference and Exposition, pp. 240–246, Mar. 1989.

Guaen, Kim "Synchronous Rectifier Improves Step–Down Converter Efficiency," PCIM, pp. 8, 11–12 & 14–15, Apr. 1993.

Gontowski et al., "Advanced New Integrated Circuits For Current–Mode Control," Proceedings of the Power Electronics Show and Conference, pp. 341–352, Oct. 1988.

Goodenough, F., "Raise Switcher Efficiency Above 90%", Electronic Design, Jan. 21, 1993.

Goodenough, Frank, "Low–Voltage Analog ICs Walt in the Wings," Electronic Design, Sep. 3, 1992.

Goodenough, Frank, "Synchronous Rectifier UPS PC Battery Life," Electronic Design, pp. 47–53, Apr. 16, 1992.

Goodenough, F., "Dozing IC Op Amps Wake Up For Input Signal," Electronic Design, Dec. 5, 1991.

Gracie, Paul D., "Intermittent Converter Saves Power," EDN, p. 151, Sep. 1, 1989.

Grant, Duncan A. et al., "Power MOSFETs, Theory and Application," pp. 239–256, Wiley–Interscience, 1989.

Harris Semiconductor, "HIP 5060 Power Control IC Single Chip Power Supply", Datasheet, Apr. 1994.

Harris Semiconductor, "HIP 5060 Power Control IC Single Chip Power Supply", Datasheet, May 1992.

Harris Semiconductor, "HIP 5060 Power Control IC Single Chip Power Supply," Preliminary Datasheet, Jan. 1992.

Harris Semiconductor, Hodgins et al., "HIP 5060 Family of Current Mode Control ICs Enhance 1 MHZ Regulator Performance," Application Note AN9212.1, pp. 11–191–11–197, 1992.

Hewett, S., "Improved Switched Mode Power Supply Regulation by Eliminating Turn–off Spikes," IBM Technical Disclosure Bulletin, vol. 31, No. 4, pp. 97–98, Sep. 1988.

Hnatek, Eugene R. "Design of Solid State Power Supplies", 3rd Ed., pp. 65–70, 1989.

Horowitz & Hill, "The Art of Electronics," pp. 356–359, Cambridge University Press, 1989.

Ikeda, S. et al., "Power MOSFET for Switching Regulator," International Telecommunications Energy Conference, Oct. 1982.

Impala Linear, "ILC6350 Dual Output Synchronous Step–Down DC–DC Controller," Advanced Information Preliminary Datasheet, pp. 1–6, Jan. 1997.

Impala Linear, "ILC6311 Synchronous 3A Switching Regulator With Auto–Light Load Mode," Preliminary Datasheet, pp. 30–38, Jan. 1997.

Impala Linear, "ILC6310 Synchronous Step–down DC–DC Converter With Auto Light–Load Mode Select," Final Datasheet, pp. 21–36, Jun. 1996.

Impala Linear, "ILC6330 13A Adjustable Synchronous DC–DC Controller," Preliminary Datasheet, pp. 39–41, Jun. 1996.

International Rectifier, "IR Application Note AN–978, HV Floating MOS–Gate Driver ICs, A Typical Block Diagram," Application Note from web page, Date Unknown.

International Rectifier, "IR Application Note AN–978, HV Floating MOS Gate Driver ICs, Full Bridge With Current Mode Control," Application Note from web page, Date Unknown.

International Rectifier, Clemente et al., "HV Floating MOS–Gate Driver IC," Application Note AN–978A, 1990.

Kassakian, J. et al., "Principles of Power Electronics," pp. 103–165, Addison–Wesley Publishing Company, 1991.

Kerridge, Brian, "Battery power breeds efficient regulators," EDN, pp. 103–108, Mar. 18, 1993.

Lee, et al., "Design of Switching Regulator with Combined FM and On–Off Control," IEEE Transactions on Aerospace and Electronic Systems, vol. AES–22, No. 6, pp. 725–731, Nov. 1986.

Lee, Y. S. and Cheng, Y. C., "A 580 kHz switching regulator using on–off control," Journal of the Institution of Electronic and Radio Engineers, vol. 57, No. 5, pp. 221–226, Sep. 1987.

Linear Technology, "LT1271/LT1269 4A High Efficiency Switching Regulators," Datasheet, 1992.

Linear Technology, "LT1432 5V High Efficiency Step–Down Switching Regulator Controller," Datasheet, 1992.

Linear Technology, "LT1170/LT1171/LT1172 100kHz, 5A, 2.5A and 1.25A High Efficiency Switching Regulators," Datasheet, 1991.

Linear Technology, "LT1524/LT3524 Regulating Pulse Width Modulator," 1990.

Linear Technology, "LT1072 1.25A High Efficiency Switching Regulator," Datasheet, 1990.

Linear Technology, "LT1074 Switching Regulator," Preliminary Datasheet, Jun. 1989.

Linear Technology, Nelson, C., Appl. Note 19, "LT–1070 Design Manual," Jun. 1986.

Linear Technology, Pietkiewicz et al., "DC–DC Converters for Portable Computers," Design Note 52, 1991.

Linear Technology, Wilcox, M., "LT1158 Half Bridge N–Channel Power MOSFET Driver" Datasheet, 1992.

Linear Technology, Williams, J. App. Note 35, "Step Down Switching Regulators," Aug. 1989.

Linear Technology, Williams, J. et al., App. Note 29,Some Thoughts on DC–DC Converters, Oct. 1988.

Linear Technology, Williams, J., App. Note 25, "Switching Regulators for Poets," Sep. 1987.

Markus, John, "Guidebook of Electronic Circuits," pp. 647 & 649, 1971.

Maxim Integrated Products, "MAX1630–MAX1635 Multi–Output, Low–Noise Power Supply Controllers for Notebook Computers," Datasheet, Apr. 1997.

Maxim Integrated Products, "MAX798 High–Accuracy Step–Down Controller With Synchronous Rectifier for CPU Power," Datasheet, Dec. 1996.

Maxim Integrated Products, "MAX887 100% Duty Cycle, Low–Noise, Step–Down, PWM DC–DC Converter," Datasheet, Sep. 1996.

Maxim Integrated Products, "MAX777L/MAX778L/MAX779L Low–Voltage Input, 3V/3.3v/5V Adjustable Output, Step–Up DC–DC Converters," Datasheet, Jul. 1996.

Maxim Integrated Products, "MAX796/MAX797/MAX799 Step–Down Controllers With Synchronous Rectifier for CPU Power," Datasheet, Nov. 1994.

Maxim Integrated Products, "MAX782 Triple–Output Power–Supply Controller for Notebook Computers," Datasheet, May 1994.

Maxim Integrated Products, "MAX783 Triple–Output Power–Supply Controller for Notebook Computers," Datasheet, May 1994.

Maxim Integrated Products, "MAX746 High–Efficiency PWM, Step–Down, N–Channel DC–DC Controller," Datasheet Nov. 1993.

Maxim Integrated Products, "MAX747 High–Efficiency PWM, Step–Down, P–Channel DC–DC Controller," Datasheet Sep. 1993.

Maxim Integrated Products, "MAX782/MAX786 Notebook Computer Power Supplies," Advance Information Datasheet, Feb. 1993.

Maxim Integrated Products, "MAX635/636/637 Preset/Adjustable Output CMOS Inverting Switching Regulators," Datasheet, Date Unknown.

Meakin, Mike, "The LM3578 Switching Power Regulator," Electronic Engineering, pp. 47–52, Jul. 1986.

Micro Linear, "ML4862 Battery Power Control IC," Datasheet, Jan. 1997.

Micro Linear, "ML4873 Battery Power Control IC," Advance Information Datasheet, Mar. 15, 1993.

Micro Linear, "ML4873 Batter Power Control IC," Datasheet, Jan. 1997 (preliminary version Mar. 1993—cited above).

Micro Linear, "ML4862 Battery Power Control IC," Datasheet, Jul. 1992.

Micro Linear, "ML4862 EVAL User's Guide," Jun. 1992.

Micro Linear, "ML 4822 DC/DC Converter Controller for Portable Computers," Datasheet, Aug. 1991.

Myers, R. and Peck, R., "200–kHz Power FET Technology in New Modular Power Supplies," Hewlett–Packard Journal, Aug. 1981.

NASA Jet Propulsion Laboratory, "Synchronous Half–Wave Rectifier," Jul. 1989.

National Semiconductor Corporation, "LM1578/LM2578/LM3578 Switching Regulator," Preliminary Datasheet, 1987.

Patel, R., "Bipolar synchronous rectifiers cut supply losses," EDN, Apr. 4, 1985.

Patel, Raoji, "Using Bipolar Synchronous Rectifiers Improves Power Supply Efficiency," Proceedings of the Power Sources Conference, Nov. 1984.

Quinnell, Richard A., "Analog IC Combines Five Functions for Battery Power Management," EDN, Apr. 23, 1992.

Redl, et al., "Overload–Protection Methods For Switching–Mode DC/DC Converters: Classification, Analysis, and Improvements," PESC '87 Record, pp. 107–118, 1987.

Redl et al., "Frequency Stabilization and Synchronization of Free–Running Current–Mode Controlled Converters," PESC '86 Record, pp. 519–530, 1986.

Rippel, W.E., "Synchronous Half–Wave Rectifier," JPL Technical Support Package, Jul. 1989.

Sakai, E. and Harada, K., "A New Synchronous Rectifier Using Bipolar Transistor Driven by Current Transformer," Fourteenth International Telecommunications Energy Conference, pp. 424–429, Oct. 1992.

Sakai, E. and Harada, K., "Synchronous Rectifier Using a Bipolar Transistor Driven by Current Transformer," Journal of the Society of Electronic Data Communication, vol. J–74–B–1, No. 8, pp. 639–646, Aug. 1991 (in Japanese, with translation).

Savant, C.J., Jr., et al., "Electronic Design: Circuits and Systems," pp. 612–613, The Benjamin/Cummings Publishing Co., 1991.

Shepard, J., "Powering portable systems," EDN, Nov. 5, 1992.

Siliconix, "Si9150 Synchronous Buck Regulator Controller, S–42677, Rev. D," Datasheet, Feb. 14, 1995.

Siliconix, "Si9150CY/BCY Synchronous Buck Converter Controller," Preliminary Data Sheet, Oct. 8, 1992.

Siliconix, "Designing DC/DC Converters with the Si9110 Switchmode Controller," Siliconix Power Products Data Book, 1991.

Siliconix, "Si91XX Synchronous Buck Controller," Datasheet, Dec. 20, 1990.

Siliconix, "Si9110/Si9111," Datasheet, Oct. 1987.

Siliconix, "Synchronous Rectification," Design Ideas, Oct. 1980.

Siliconix, "High–Efficiency Buck Converter for Notebook Computers," Application Note AN92–4, Date Unknown.

Soclof, Sidney, "Applications of Analog Integrated Circuits," Figure 2.25, pp. 74–75, Prentice–Hall, Inc., 1985.

Sokal et al., "Control Algorithms and Circuit Designs For Optimally Flyback Charging an Energy–Storage Capacitor," IEEE Fifth Applied Power Electronics Conference, pp. 295–301, 1990.

Steigerwald, R., "High–Frequency Resonant Transistor DC–DC Converters," IEEE Transactions on Industrial Electronics, vol. IE–31, No. 2, pp. 181–191, May 1984.

Taylor, "Flyback Converter,"Electronic Engineering, p. 23, Jul., 1976.

Toyota, "SB3052P Dual Channel Step Down DC–DC Converter Controller," Datasheet, Feb. 1998.

Toyota, "SB3011P Step Down DC–DC Converter Controller," Datasheet, Mar. 1997.

Toyota, "SB3012P Step Down DC–DC Converter Controller," Datasheet, Mar. 1997.

Toyota, "SB3013P Step Down DC–DC Converter Controller," Datasheet, Mar. 1997.

Toyota, "SB3020P Dual Channel Step Down DC–DC Converter Controller," Datasheet, Mar. 1997.

Toyota, "SB3050P Dual Channel Step Down DC–DC Converter Controller," Datasheet, Mar. 1997.

Toyota, "SB3030P Step Down DC–DC Converter Controller," Datasheet, Dec. 1996.

Toyota, "SB3031P Step Down DC–DC Converter Controller," Datasheet, Dec. 1996.

Toyota, "SB3010P Synchronous Stepdown DC–DC Converter Controller," Datasheet, Aug. 10, 1995.

Uchida, Takahito, "Switching Regulator Controller," Japanese Inventor Associated Disclosed Technology Publication No. 92–2362, published Feb. 15, 1992 (in Japanese, with translation).

Unitrode, "UCC19411/2/3, UCC29411/2/3, UCC39411/2/3 Low Power Synchronous Boost Converter," Preliminary Datasheet, Apr. 1998.

Unitrode, "UCC3941–3/–5/–ADJ 1V Synchronous Boost Converter," Preliminary Datasheet, Mar. 1997.

Unitrode, "UCC1582, UCC2582, UCC3582 High Efficiency Synchronous, Step Down Controller," Preliminary Datasheet, Jan. 1997.

Unitrode, "UC1895, UC2895, UC3895 Synchronous Rectifier Buck PWM Controller," Advance Information Datasheet, Oct. 5, 1992.

Unitrode, "Using Bipolar Synchronous Rectifiers Improves Power Supply Efficiency," Application Note, Jun. 1985.

Wilcox, M., "The LT1158: Low Voltage, N–Channel Bridge Design Made Easy," Linear Technology, Feb. 1992.

Williams, J., "Designing supplies for powering LCD backlighting," EDN, Oct. 29, 1992.

Williams, J., "1.5 to 5V converter supplies 200mA," EDN, Oct. 15, 1992.

Williams, J., "Correcting power–supply problems," EDN, Dec. 10, 1991.

Williams, Jim, "Basic Principles and Ingenious Circuits Yield Stout Switchers," EDN, Jan. 19, 1990.
Williams, J., "Astute designs improve efficiencies of linear regulators," EDN, Aug. 17, 1989.
Williams, J., "Design linear circuits that serve digital system needs," EDN, Apr. 27, 1989.
Williams, J., "Clever techniques improve thermocouple measurements," EDN, May 26, 1988.
Williams, J., "Galvanically isolated switching supplies provide high power," EDN, Nov. 26, 1987.
Williams, J., "Regulator IC speeds design of switching power supplies," EDN, Nov. 12, 1987.
Williams, J., "Signal conditioning circuits use μpower design techniques," EDN, Aug. 20, 1987.
Williams, J., "Micropower circuits assist low–current signal conditioning," EDN, Aug. 6, 1987.
Williams, J., "Switching regulator takes on more power," Electronic Product Design, Jan. 1986.
Williams, J., "Considerations for Five Volt Linear Circuits," Professional Program Session Record 20, Circuits for Analog Signal Processing and Data Conversion is Single +5V Supply Systems, Wescon/85, Nov. 1985.
Williams, J., "Analog circuits operate from a 1.5V cell," EDN, Sep. 19, 1985.
Williams, J., "Refine V/F–converter operation with novel design techniques," EDN, May 30, 1985.
Williams, J., "Design techniques extend V/F–converter performance," EDN, May 16, 1985.
Williams, J., "Design linear circuits for 5V operation," EDN, May 2, 1985.
Williams, J., "Chopper amplifier improves operation of diverse circuits," EDN, Mar. 7, 1985.
Williams, J., "Use low–power design methods to condition battery outputs," EDN, Oct. 18, 1984.
Williams, J., "Special circuit–design techniques enhance regulator performance," EDN, Sep. 1, 1983.
Williams, J., "Conversion techniques adapt voltages to your needs," EDN, Nov. 10, 1982.
Williams, J., "Design dc–dc converters to catch noise at the source," Electronic Design, Oct. 15, 1981.
Williams, J., "Employ pulse–width modulators in a wide range of controllers," EDN, Sep. 2, 1981.
Williams, J., "Bridge forms synchronous rectifier," EDN, Date Unknown.
Williams, J., and Huffman, B., "Switched–capacitor networks simplicity dc/dc–converter designs," EDN, Nov. 24, 1988.
Williams, J., and Huffman, B., "Design dc/dc converters for power conservation and efficiency," EDN, Nov. 10, 1988.
Williams, J., and Huffman, B., "Proper instrumentation eases low–power dc/dc–converter design," EDN, Oct. 27, 1988.
Williams, J., and Huffman, B., "Precise converter designs enhance system performance," EDN, Oct. 13, 1988.
Williams, J., and Dendinger, S., "Simplify feedback controllers with a 2–quadrant PWM IC," EDN, May 26, 1983.
Williams, J., and Waller, B., "Performance–Enhancement Techniques for Three–Terminal Regulators," New Electronics, Oct. 4, 1983.
Rudolf F. Graf, *Modern Dictionary of Electronics*, Indianapolis: Sams & Co., 1984. pp. 402–403 (no month).
Irving M. Gottlieb,*Practical Power–Control Techniques*, Indianapolis: Sams & Co., 1987. pp. 116–123 (no month).
Leo F. Casey,"Circuit Design for 1–10 MHz DC–DC Conversion," pp. 1–14 and 73–80, Jan. 1989.
Maxim Data Sheet for MAX635/36/37, pp. 6/49–6/56, 1989. (no month).
Maxim Data Sheet for MAX638, pp. 6/57–6/64, 1989. (no month).
S. Peitkiewicz,"A Low–Voltage, Micro–Power 1A Switching Regulator," International Solid State Circuits Conference, pp. 1–5, 1990. (no month).
Micro Linear Data Sheet for ML4822, p. 1, Aug. 1991.
Siliconix Data Sheet for SI9150, pp. 1–17, application data sheets (3 pages), Sep. 1991.
Brian Huffman,"Linear Technology Application Note 46," Nov. 1991.
Maxim Data Sheet for MAX639, pp. 1–8, Dec. 1991.
Irving M. Gottleib,*Electronic Power Control*, Indianapolis: Tab Books, 1991 (no month).
"Linear Technology Magazine," vol. 2, No. 1, pp. 1, 12, and 19, Feb. 1992.
Micro Linear Data Sheet for ML4860, p. 1, Feb. 1992.
Micro Linear Data Sheet for ML4861, pp. 6/146–6/150, Jul. 1992.
Max782 EV Kit, Mar. 1993.
"Linear Technology Magazine," vol. 2, No. 3, pp. 1, 8, and 19, Oct. 1992.
Linear Technology Data Sheet for LT1073, pp. 1–20. (no date).
Linear Technology Data Sheet for LT1847/1847, LT3846/3847, pp. 5/113–5/120. (no date).
Unitrode Data Sheet for UC1846/7, UC2846/7, UC3846/7, pp. 1–7. (no date).

* cited by examiner

| STATE TABLE FOR RS LATCH FLIP-FLOP FF2 | | | |
|---|---|---|---|
| STATE OF POWER SWITCHES | R | S | Q |
| FIRST POWER SWITCH ON SECOND POWER SWITCH OFF | 1 | 0 | 0 |
| FIRST POWER SWITCH OFF SECOND POWER SWITCH ON | 0 | 0 | HOLDS PREVIOUS STATE |
| FIRST POWER SWITCH OFF SECOND POWER SWITCH OFF | 0 | 1 | 1 |
| FIRST POWER SWITCH ON SECOND POWER SWITCH OFF | 1 | 1 | UNDEFINED (THIS OUTPUT STATE OF RS LATCH FLIP-FLOP FF2 IS OVERRIDEN BY NOR GATE 306 WHICH TURNS OFF SECOND POWER SWITCH) |

FIG. 4

| STATE TABLE FOR NOR GATE | | | |
|---|---|---|---|
| INPUT FROM AND GATE | INPUT FROM RS LATCH FLIP-FLOP FF2 | OUTPUT OF NOR GATE TO SECOND POWER SWITCH | CORRESPONDING STATE OF POWER SWITCHES |
| 1 | 0 | 0 | FIRST POWER SWITCH ON SECOND POWER SWITCH OFF |
| 0 | 0 | 1 | FIRST POWER SWITCH OFF SECOND POWER SWITCH ON |
| 0 | 1 | 0 | FIRST POWER SWITCH OFF SECOND POWER SWITCH OFF |
| 1 | 0 | 0 | FIRST POWER SWITCH ON SECOND POWER SWITCH OFF |

FIG. 5

| INPUT | OUTPUT |
|---|---|
| 0 | 0 |
| 1 | 0 |
| ⤓ | 0 |
| ⤒ | 1 |

VOLTAGE MODE FEEDBACK BURST MODE CIRCUIT

BACKGROUND OF THE INVENTION

This invention relates to voltage regulators. In particular, this invention relates to switch-mode regulators.

Switch-mode regulators, or switching regulators as they are commonly known, are typically used as voltage regulators because they exhibit higher efficiency than an equivalent linear regulator circuit at heavy loads. A typical switching regulator operates by repeatedly turning a power switch fully on and then fully off, generating a pulse-width modulated signal that is averaged to the final voltage with an inductor. Due to the switching nature of the power transistor drive, the efficiency of a typical switch-mode circuit falls off as the load decreases, since a fixed amount of power is wasted in the drive circuitry regardless of load. One method used to avoid this efficiency loss at light loads is to sense the current flowing in the output, and to omit switching cycles when the load is light. This is referred to in this description as Burst Mode™. Stated another way, burst mode is a mode of operation which uses the technique of cycle-skipping to reduce switching losses in a switching regulator and increase the operating efficiency at low output current levels.

Burst mode is relatively easy to implement in a current-feedback regulator, since the output current signal is available to the regulator to allow it to decide when the load is light. A typical voltage feedback switching regulator does not have this load current signal available, and must make the decision to enter burst mode in another manner.

In view of the foregoing, it would be desirable to provide a circuit and a method for enabling a voltage-mode feedback switching regulator to enter and exit burst mode automatically.

It would further be desirable to provide a technique for enabling a voltage-mode feedback switching regulator to enter and exit burst mode automatically for both synchronous and non-synchronous topologies of the voltage-mode feedback switching regulator circuit.

SUMMARY OF THE INVENTION

It is an object of the present invention to provide an improved voltage-mode feedback switching regulator circuit. The circuit can operate in a synchronous or non-synchronous fashion, as well as in step-up or step-down configurations, with minor modifications. The circuit provides a switch circuit having a duty cycle which can be set, a burst mode circuit having a pulse-width modulator generator and a fixed minimum non-zero duty cycle generator, the burst mode circuit being implemented to set the duty cycle of the switch circuit and to determine whether the switch circuit should go into burst mode, and a feedback circuit for receiving a signal from the switch circuit and providing a feedback signal to the burst mode circuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 is a state table illustrating the possible states of a flip-flop in the synchronous switching regulator according to the present invention.

FIG. 5 is a state table illustrating the possible states of a NOR gate in the synchronous switching regulator according to the present invention.

DETAILED DESCRIPTION OF THE INVENTION

Figure 1:
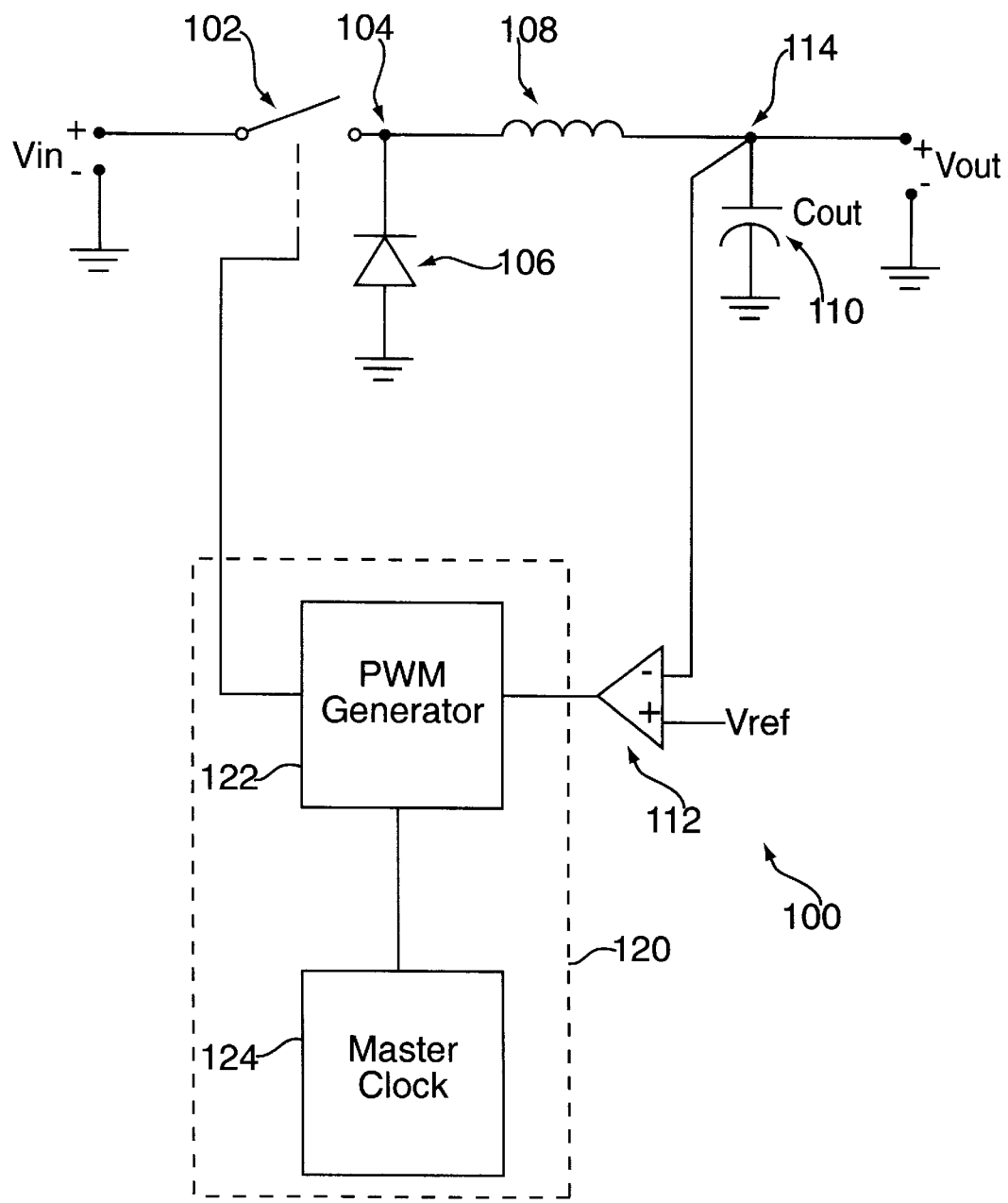
FIG. 1 is a block diagram of a known step-down voltage-mode feedback switching regulator.

In general, a switching regulator generates an output voltage proportional to the input voltage, with the proportionality set by the duty cycle of the pulse width signal at the power switch. Voltage feedback switching regulators operate by sensing the output voltage and setting the duty cycle of the switching regulator as required by the variations in the output voltage. The output voltage of the switching regulator is proportional to the inverse of the current required by the load. When a greater current is required by the load, the time the duty switch is left in the ON position is increased to meet the current requirement of the load, as is known to one skilled in the art.

This invention allows a switching regulator to enter burst mode at low output current levels by sensing the output voltage level, without directly sensing the current in the output. This invention can be applied to both non-synchronous and synchronous converters with only slight modifications.

According to the principles of the invention, a voltage feedback switching regulator may be adapted to incorporate an automatic burst mode. The automatic burst mode improves efficiency of the switching regulator at light load currents. In addition, the sensing mechanism which determines the duty cycle of the switching regulator, and also sends the circuit into burst mode, operates without adding additional components in the load current path.

To accomplish the objectives of the invention, a switching regulator designed according to the principles of the invention preferably incorporates a fixed minimum non-zero signal generator to approximate the output load, such that when the load current drops below a certain pre-determined level, the switching regulator enters burst mode. This signal works in tandem with a pulse-width-modulated (PWM) signal, as will be explained, for controlling the duty cycle, the PWM signal being inversely proportional to the output voltage as is well known in switching regulators.

A non-synchronous system typically is composed of a power switch to a node, and a diode from that node to ground. An inductor is connected from that node to the output, and a capacitor is typically connected from the output node to ground. A feedback amplifier senses the voltage at the output node and instructs a pulse-width modulator (PWM) circuit to adjust the duty cycle of the drive signal to the power switch accordingly. A logic HIGH state on the switch control line turns on the switch, while a logic LOW state turns it off.

At high load currents, the power switch conducts current while it is on and the diode conducts current the rest of the time. While the power switch is conducting, the current in the inductor increases linearly, reaching a positive peak immediately before the power switch stops conducting. While the diode is conducting, the current in the inductor decreases linearly, reaching a minimum value immediately before the diode stops conducting, such that the mean value of the peak-to-peak ripple current in the inductor equals the load current, as is well known in the art. As the load current drops, the circuit reaches the point that the load current falls below half the peak-to-peak ripple current in the inductor. When this happens, the current flowing in the inductor reverses during part of the cycle.

As soon as the inductor current reverses, the voltage at the input node (where the diode, switch, and inductor meet) rises above ground and conduction through the diode ceases. Therefore, as the circuit enters discontinuous conduction, the time that the diode conducts is reduced. The shortening of conduction time for the diode may increase the output voltage, because the output voltage is set by the conduction time of the power switch and the diode. To keep the output voltage constant, the feedback amplifier commands the PWM circuit to reduce the ON-time of the power switch in proportion to the reduction of conduction time of the diode.

In a non-synchronous switching regulator constructed according to the principles of the invention, a PWM generator preferably generates a duty cycle for the switch, which may preferably be formed from a MOSFET transistor, but will also work with any suitable switching semiconductor, such that the duty cycle is inversely proportional to the output voltage. For example, when the output current demanded by the load is low, the output voltage rises above the regulated level, and the feedback mechanism drives the duty cycle down. However, the duty cycle does not drop below a pre-determined level because the fixed minimum non-zero duty signal generator prevents the duty cycle from falling below the pre-determined level. Therefore, the duty cycle will be preserved at an artificially high level.

At this point, the feedback mechanism attempts to decrease the duty cycle even more, as the feedback mechanism is communicating that the load is being supplied with more current than it requires. This extra supply of current to the load results from the signal generated by the fixed minimum non-zero duty signal generator. This process continues until the feedback mechanism finally instructs the pulse-width-modulator generator that a zero signal is required—that is, the feedback amplifier commands the switch to begin the duty cycle in an OFF state. When an OFF or zero signal is produced by the PWM generator at the outset of the duty cycle, digital logic is signaled to send the switching regulator into burst mode. Burst mode disables the minimum non-zero duty cycle as well as the normal duty cycle, and the switching regulator shuts off. This OFF state continues until the output voltage drops sufficiently such that the feedback mechanism requests an ON state at the beginning of the duty cycle from the PWM generator. The PWM generator is then turned on at the beginning of the duty cycle. Thereafter, the digital logic is informed that the PWM generator is no longer requesting a zero output, and the switching regulator is restarted. The net result of this operation is to save power during burst mode because the switching regulator can shut down until the output current requires the PWM circuit to start the duty cycle again.

A synchronous voltage-mode switching regulator can be modified to enter burst mode in a fashion similar to a non-synchronous voltage mode switching regulator. The synchronous case differs from the non-synchronous case in that the diode is replaced with a second power switch which is driven out of phase from the first power switch.

The advantage of a synchronous system over a non-synchronous system is lower power consumption. Typically, dissipation of power across a second power switch is substantially lower than the dissipation of power across a diode because a switch, which may preferably be formed from a MOSFET transistor, has a voltage drop proportional to its ON resistance multiplied by the current flowing in it. This value is generally lower than the typical 700 millivolts voltage drop across the diode when conducting.

However, unlike the diode in the non-synchronous case, the second power switch in the synchronous case conducts current in either direction, and does not stop conducting when the inductor current reverses. Thus, as the load current drops, the conduction time ratio between the two switches remains constant, the output voltage remains constant, and the PWM circuit never enters burst mode. Therefore, the synchronous switching regulator requires additional components to enter and exit burst mode.

To allow the circuit to enter burst mode, an additional loop is needed to sense when the inductor current has reversed and to turn off the second power switch, thereby forcing it to behave like the diode in the non-synchronous case. This can be accomplished by watching the voltage drop across a resistive element in series with the second power switch. A comparator is suitable for the task of measuring this voltage drop. The resistive element can preferably be the switch itself because, as mentioned above, there is a measurable voltage drop across the switch when conducting. When the sign of the voltage across the resistive element indicates that the inductor current has reversed, the second power switch is shut off.

Typically, a circuit having an inductor and some parasitic capacitance experiences some unwanted ringing. In a switching regulator constructed according to the present invention, ringing may occur once the second power switch has been shut off. This ringing may affect the sign across the resistive element, thereby causing the second power switch to switch on and off repeatedly in an undesirable fashion. Additional circuitry may preferably be added to avoid cycling of the second power switch as a result of ringing in the circuit, as will be explained.

As shown in FIG. 1, and as is well-known in the art, a non-synchronous voltage-mode switching regulator system 100 is typically composed of a first power switch 102 from the input to node 104, a diode 106 connected from node 104 to ground, an inductor 108 connected from node 104 to an output node 114, and a capacitor 110 connected from output node 114 to ground. A feedback amplifier 112 senses the voltage at output node 114, compares this voltage to a reference voltage, and preferably instructs the PWM circuit 120 to adjust the duty cycle of the drive signal to first power switch 102 as the load current requires. The PWM generator 122 is triggered to begin a duty cycle by the master clock 124. A logic HIGH state on the switch control line turns on first power switch 102, while a logic LOW state turns it off (as indicated by the dotted line at the connection between PWM generator 122 and first power switch 102.)

At high load currents, first power switch 102 conducts current while it is on, and diode 106 conducts current for substantially the rest of the time. As the load current drops, the circuit reaches the point that the load current falls below half the peak-to-peak ripple current in inductor 108. When this happens, the current flowing in inductor 108 reverses during part of the duty cycle. As soon as the inductor current reverses, the voltage at node 104 rises above ground and conduction through diode 106 ceases. Because the output voltage at output node 114 is proportional to the input voltage as set by the ratio of the conduction time of first power switch 102 to that of diode 106, as the circuit enters discontinuous conduction, wherein diode 106 ceases conduction before the next cycle begins, the time that diode 106 conducts is reduced. Thus, in order to keep the output voltage constant, the feedback amplifier 112 commands the pulse-width modulator circuit 120 to reduce the ON-time of first power switch 102 accordingly.

Figure 2:
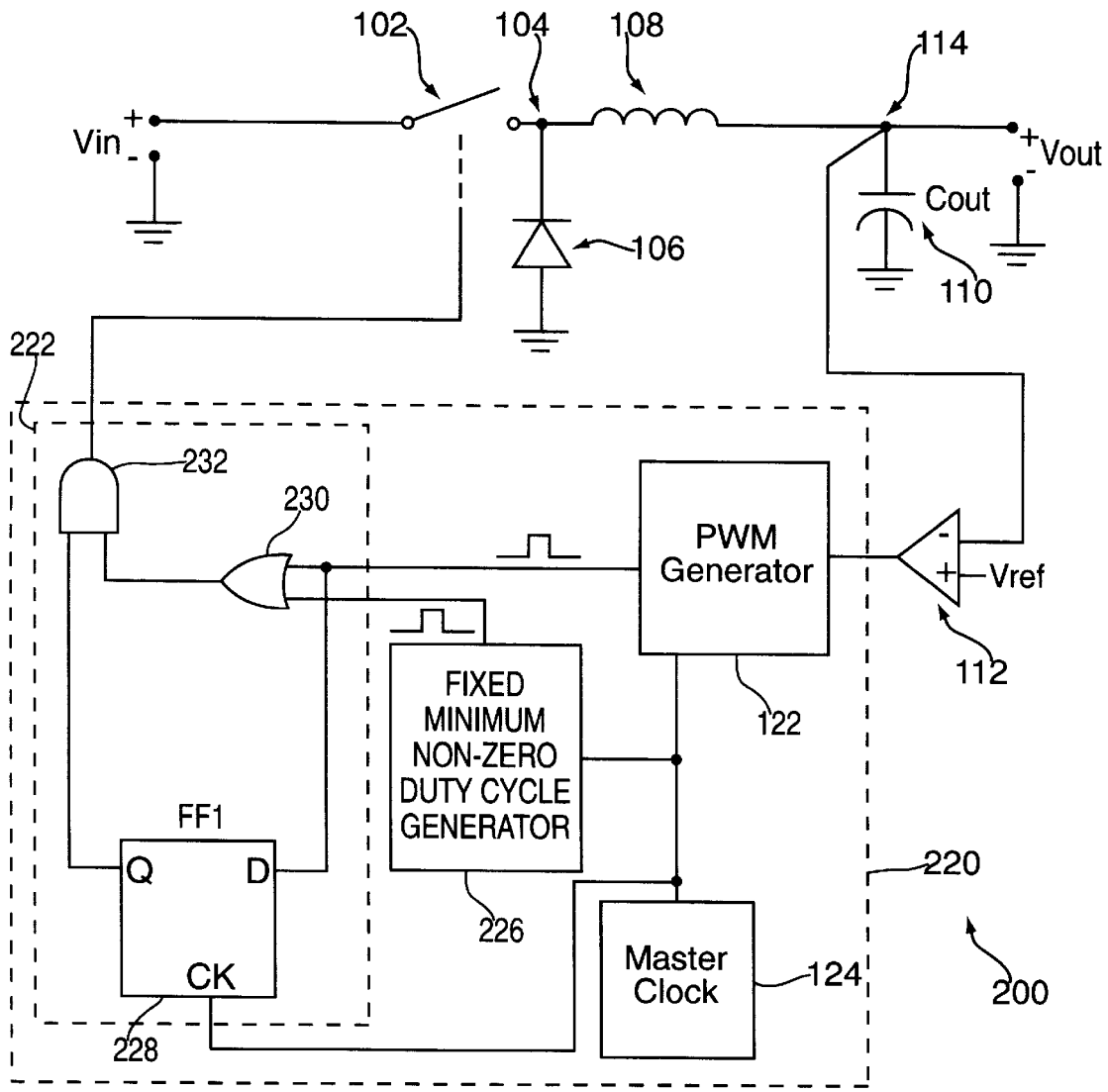
FIG. 2 is a block diagram of a non-synchronous voltage-mode feedback burst mode circuit according to the present invention.

In one embodiment of the invention, as shown in FIG. 2, a voltage mode non-synchronous switching regulator 200 may utilize the principles of the invention to automatically enter burst mode. In the non-synchronous case, the circuit can use the above-mentioned changing duty cycle as an indication to enter burst mode. FIG. 2 illustrates a circuit to accomplish this according to the principles of the invention.

The PWM circuit 220 in FIG. 2 generates a duty cycle of at least a predetermined minimum value, unless it is instructed to shut down completely. If the load current drops and feedback amplifier 112 requests a duty cycle lower than the predetermined value, PWM circuit 220 responds with the minimum value as set by the fixed minimum non-zero duty cycle generator 226. The extra current being supplied by first power switch 102 causes the voltage at output node 114 to rise, thereby causing feedback amplifier 112 to request even less ON-time from first power switch 102. Feedback amplifier 112 quickly adjusts to request lower and lower duty cycles until it requests a zero duty cycle to bring the output voltage back down. PWM circuit 220 recognizes this condition because the input of burst flip-flop FF1 228, provided as part of logic circuit 222, is connected to the output of PWM generator 122, thereby receiving the output of PWM generator 122 at the start of each master clock cycle. The master clock 124 initiates the timing cycle for all internal components. If feedback amplifier 112 requests any non-zero duty cycle, the output of PWM generator 122 will be at a logic HIGH at the beginning of the cycle. If it is logic LOW when the cycle starts, the circuit assumes that feedback amplifier 112 is commanding zero duty cycle, and saves the LOW value in burst flip-flop FF1 228. The output of burst flip-flop FF1 228 then disables the drive to first power switch 102 by sending a logic LOW to AND gate 232. AND gate 232 blocks the signal path from fixed minimum non-zero duty cycle generator 226 to first power switch 102, causing the switching regulator 200 to enter burst mode.

In an alternative embodiment of the invention, (not shown), this signal from burst flip-flop FF1 228 can be used to power down unused portions of regulator circuit 200 that will not be used in burst mode in order to realize additional efficiency improvement. Using this signal from burst flip-flop FF1 228 to power down output current limiting circuitry during burst mode is one suitable embodiment of this principle, because it is generally true that there will not be an overcurrent condition while in burst mode.

After several cycles have been skipped, the output voltage at output node 114 drops to the point that feedback amplifier 112 begins to request output pulses again. The pulse-width modulator circuit 220 detects this condition by noting the presence of a signal from PWM generator 122 at the start of the master clock cycle. This signal is stored as a logic HIGH in burst flip-flop FF1 228, re-enabling the drive to first power switch 102 which begins receiving signals to generate pulses. If the load current remains light, the voltage at output node 114 quickly rises to the point that feedback amplifier 112 requests zero pulse width, and the burst cycle will repeat.

Figure 3:
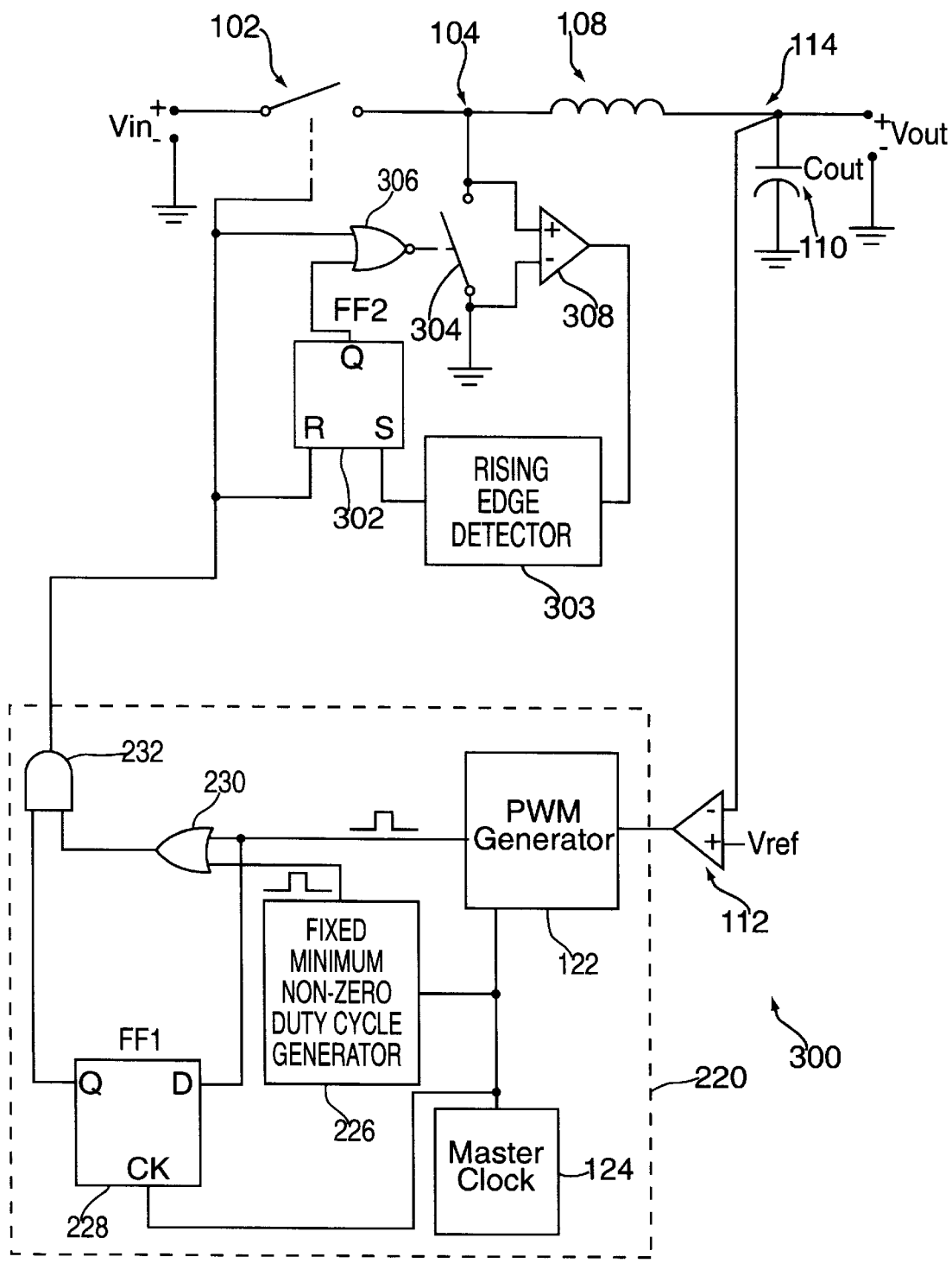
FIG. 3 is a block diagram of a synchronous voltage-mode step-down feedback burst mode circuit according to the present invention.

Now consider the synchronous case: A synchronous switching regulator circuit 300, as shown in FIG. 3, differs from the non-synchronous case because diode 106, shown in FIGS. 1 and 2, is replaced with a second power switch 304, driven out-of-phase from first power switch 102.

Figures 10, 11:
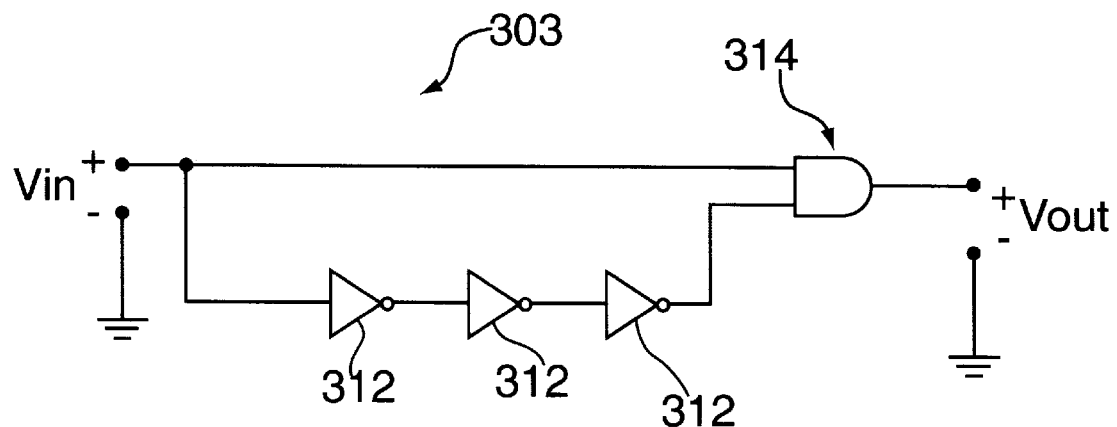
FIG. 10 is a block diagram of arising edge detector.
FIG. 11 is a truth table for a rising edge detector.

Second power switch is turned on substantially simultaneously to first power switch 102 turning off through the following sequence of events: first, when first power switch 102 is on, the R-input of RS-latch flip-flop (FF2) 302 is high. However, the S-input of FF2 302 is low because of the configuration of the comparator 308 and rising edge detector 303. That is, as long as comparator 308 records a positive voltage between node 104 and ground, which occurs when first power switch 102 is on, comparator 308 sends a constant high signal to rising edge detector 303. Rising edge detector 303 then sends a low signal to S-input of FF2 302 (see state table of rising edge detector in FIG. 11 which illustrates that a continuous high input to rising edge detector 303 will output a low signal. The structure of rising edge detector 303 is shown in FIG. 10. A rising edge detector is a circuit that responds to a positive transition on its input with a short positive pulse at its output. This structure indicates that rising edge detector sends out a high output only upon a positive transition due to the slight propagation delay from the three inverters 312. This propagation delay from the three inverters causes the AND gate 314 to momentarily have both inputs high upon a positive transition, as is known to one skilled in the art, thereby causing a momentary high output at the end of AND gate 314. Thus, the output under all other conditions, as shown in the state table in FIG. 11, is a logic low, because either the inverters will produce an low signal or the connection to Vin will produce a low signal. Fine-tuning of the timing of rising edge detector 303 can be accomplished by placing a capacitor in a suitable position.) Thus the Q-output of FF2 302 will be low because it has a high R-input and a low S-input (see state table for FF2 in FIG. 4.) When first power switch 102 turns off, the R-input of FF2 302 goes low, and one of the inputs of NOR gate 306 goes low. The R-input of FF2 302 going low does not affect the Q-output of FF2 302, which remains low because it holds the state that it was in previously (see the second state of state table in FIG. 4). Thus, both inputs of NOR gate 306 are low, and the output of NOR gate 306 goes high, turning second power switch 304 on.

Unlike diode 106 in FIGS. 1 and 2, second power switch 304 can conduct current in either direction, and continues to conduct when the inductor current reverses. As the load current drops, the conduction time ratio between first power switch 102 and second power switch remains constant, the output voltage remains constant, and the PWM circuit 220, in an unmodified state, would not enter burst mode.

To allow the synchronous switching regulator 300 to enter burst mode, an additional loop is needed to sense when the inductor current has reversed and, thereafter, to turn off second power switch 304, thereby forcing second power switch 304 to behave like diode 106 in the non-synchronous case. Under certain circumstances, burst mode may be illustrated by the third state in the state tables of FIGS. 4 and 5 which correspond to both switches being off. This state corresponds to burst mode if, during this state, feedback mechanism 112 requests a zero output at the start of the duty cycle generated by PWM generator 122, effectively disabling first power switch 102.

The state of both switches being off may occur through the following events: first power switch 102 is put in an OFF-position, or "opened". Thereafter, current flow in the inductor cannot change instantaneously, and, as a result, the voltage at node 104 starts to move negative. But it is held at a voltage slightly lower than ground by second power switch 304 (when in an ON position, second power switch 304 substantially couples node 104 to ground), which turns ON substantially simultaneously to first power switch 102 opening or turning OFF, as explained above.

After second power switch 304 has turned on and sufficiently dissipated the current stored in inductor 108, the voltage drop from node 104 and across resistive element 610 (See FIG. 6) in series with second power switch 304 as measured by a comparator 308 turns positive. The comparator 308 can measure either the voltage drop across resistive element 610 and switch 304, as shown in switching regulator 600 in FIG. 6, or just across resistive element 710, as shown in switching regulator 700 in FIG. 7. This resistive element may preferably be second power switch 304 itself (as shown in FIG. 3), because some current is dissipated by the relatively small voltage drop across second power switch 304, resulting in second power switch 304 acting as a resistive element. In the latter case, comparator 308 measures the voltage drop directly across second power switch 304.

When the sign of the voltage across the resistive element, in the preferred embodiment second power switch 304, goes positive, the inductor current is assumed to have reversed. The positive voltage across second power switch 304 results in second power switch 304 being shut off because comparator 308 sends a high signal to rising edge detector 303.

At the rising edge of the high signal from comparator 308, rising edge detector 303 sends a high signal to the S-input of RS latch flip-flop FF2 302. This causes the S-input to go high as shown in the fourth state of the state table in FIG. 11, thereby raising the Q-output of RS latch flip-flop FF2 302. This high signal at Q-output of RS latch flip-flop FF2 302 sends a high signal to one of the inputs of NOR gate 306, which forces NOR gate 306 output low, as shown in the third state of the state table in FIG. 5. If the circuit is neither in burst mode, nor entering burst mode, first power switch 102 preferably closes substantially simultaneously to the opening of second power switch 304 because a duty cycle is requested by pulse-width modulation circuit 220.

As second power switch 304 shuts off, node 104 may briefly go high impedance and oscillates as the inductor forms an LC-circuit with parasitic capacitance found at node 104, as is known in the art. To prevent second power switch 304 from cycling on and off as node 104 rings below ground, the first turn-off event for second power switch 304 is used to set an RS latch flip-flop FF2 302. At this first turn-off event, RS latch flip-flop FF2 302 holds second power switch 304 off during undesirable cycling because RS latch flip-flop FF2 302 is unaffected by additional logic LOW or logic HIGH outputs from rising edge detector 303 (See state table of FIG. 4, which indicates that as long as R remains low, once S has gone high at least one time, Q will not be affected by further changes in S.) At the time first power switch 102 turns on, RS latch flip-flop FF2 302 output Q may become undefined for a brief period as comparator 308 sends the rising edge of a high signal to rising edge detector 303, which sends a brief high signal to the S-input of FF2 302. (See state table in FIG. 4, state 4). However, this undefined state does not affect operation of the circuit because NOR gate 306 overrides the Q-output of RS latch flip-flop 302.

In summation, the primary difference between non-synchronous and synchronous circuits is the operation of second power switch 304 in FIG. 3 as compared with the operation of diode 106 in FIGS. 1 and 2. However, first power switch 102 enters and exits burst mode in the synchronous circuit similar to the way it enters and exits burst mode in the non-synchronous circuit. Thus, when load current decreases sufficiently, PWM circuit 220 causes first power switch 102 to shut down in the manner described above with reference to the non-synchronous circuit.

Therefore, this modified synchronous circuit switches in and out of burst mode in a manner similar to the non-synchronous circuit described in FIG. 2, thereby improving efficiency at low load currents while maintaining the efficiency benefits of a synchronous switching circuit at high currents.

All the circuits described in this application until this point have been buck-style or step-down regulators. Step-down regulators are employed to decrease the level of the output dc voltage below the mean value of the unregulated input voltage. Boost-style, or step-up regulators, can be employed to boost the level of the output dc voltage above that of the unregulated input voltage.

Figure 6:
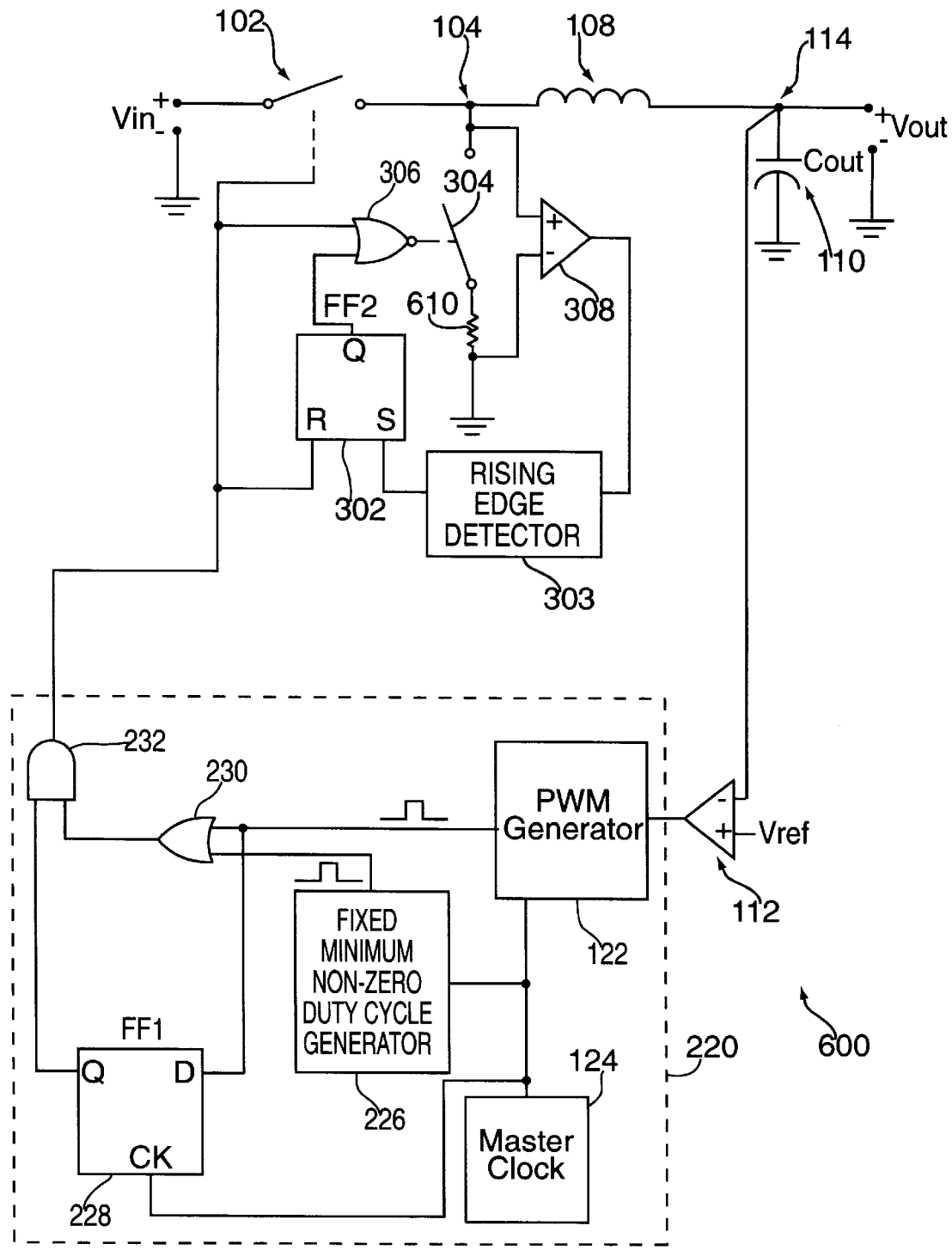
FIG. 6 is a block diagram of a synchronous step-down voltage-mode feedback burst mode circuit according to the present invention.
Figure 7:
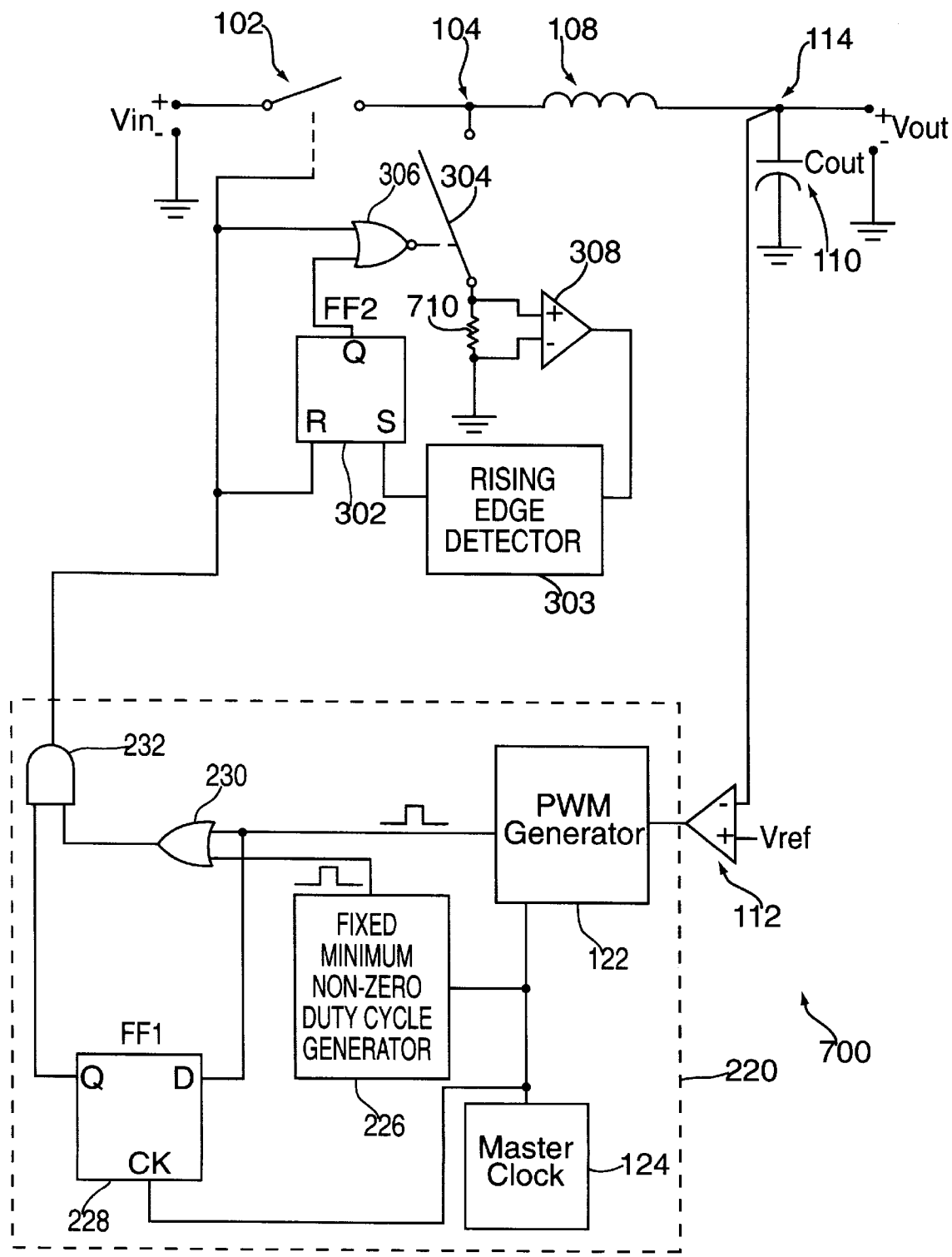
FIG. 7 is a block diagram of a synchronous step-down voltage-mode feedback burst mode circuit according to the present invention.
Figure 8:
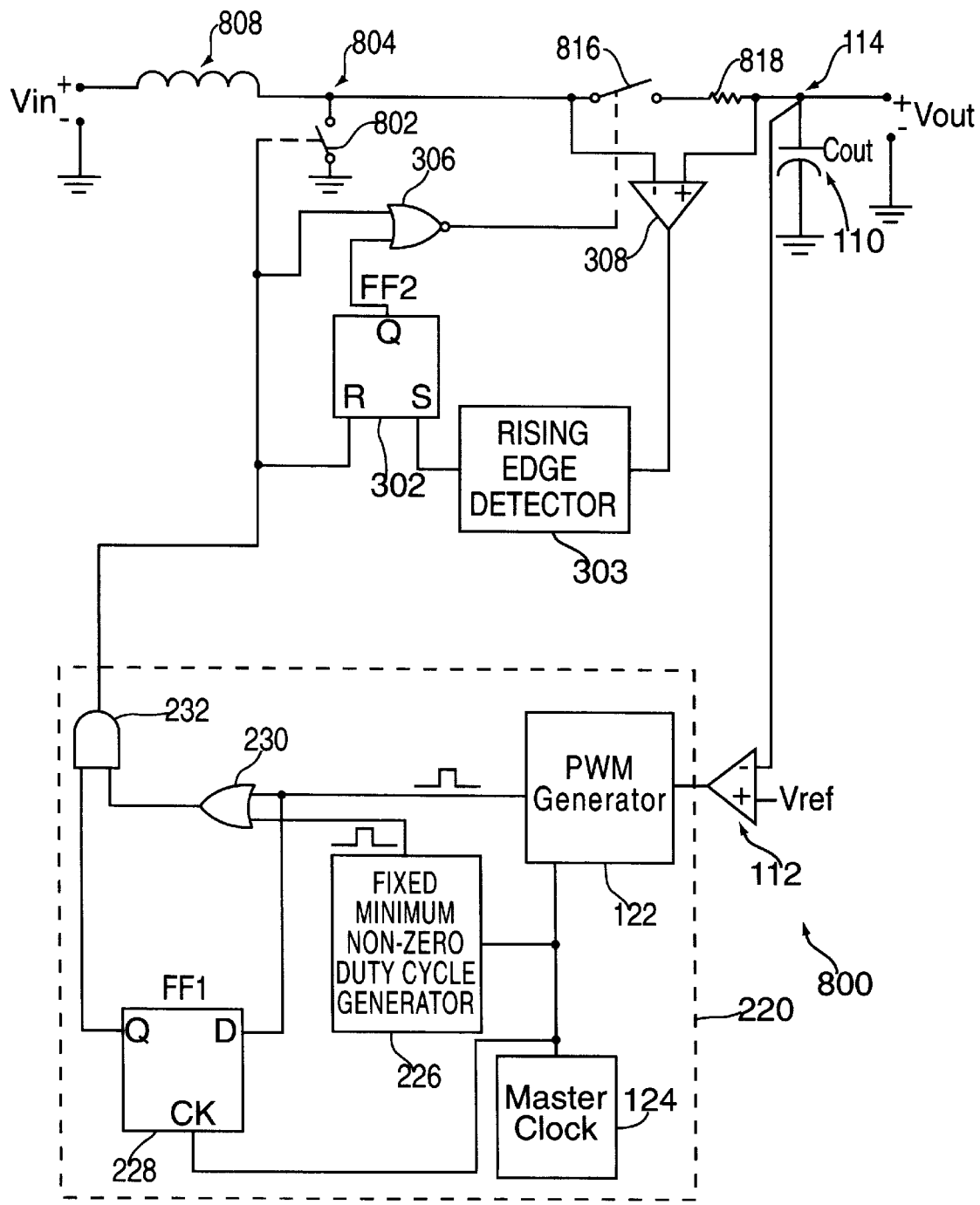
FIG. 8 is a block diagram of a synchronous step-up voltage-mode feedback burst mode circuit according to the present invention.

FIG. 8 shows a step-up switching regulator 800 constructed according to the principles of the invention. The primary difference between step-up switching regulator 800 and switching regulator 300 shown in FIGS. 3, 6, and 7 is the position of the inductor and the switches.

In the step-up switching regulator shown in FIG. 8, first power switch 802 occupies the position where diode 106 was placed in FIGS. 1 and 2. Inductor 808 occupies the position of first power switch 102 in FIGS. 1–3, and 6–7. Second power switch 816 occupies the position of inductor 108 in FIGS. 1–3, and 6–7. Preferably, the primary difference between the output signal of the step-up switching regulator 800 and the step-down switching regulator of FIGS. 1–3, and 6–7 is that the signal in the step-up switching regulator 800 is increased in magnitude instead of decreased.

Figure 9:
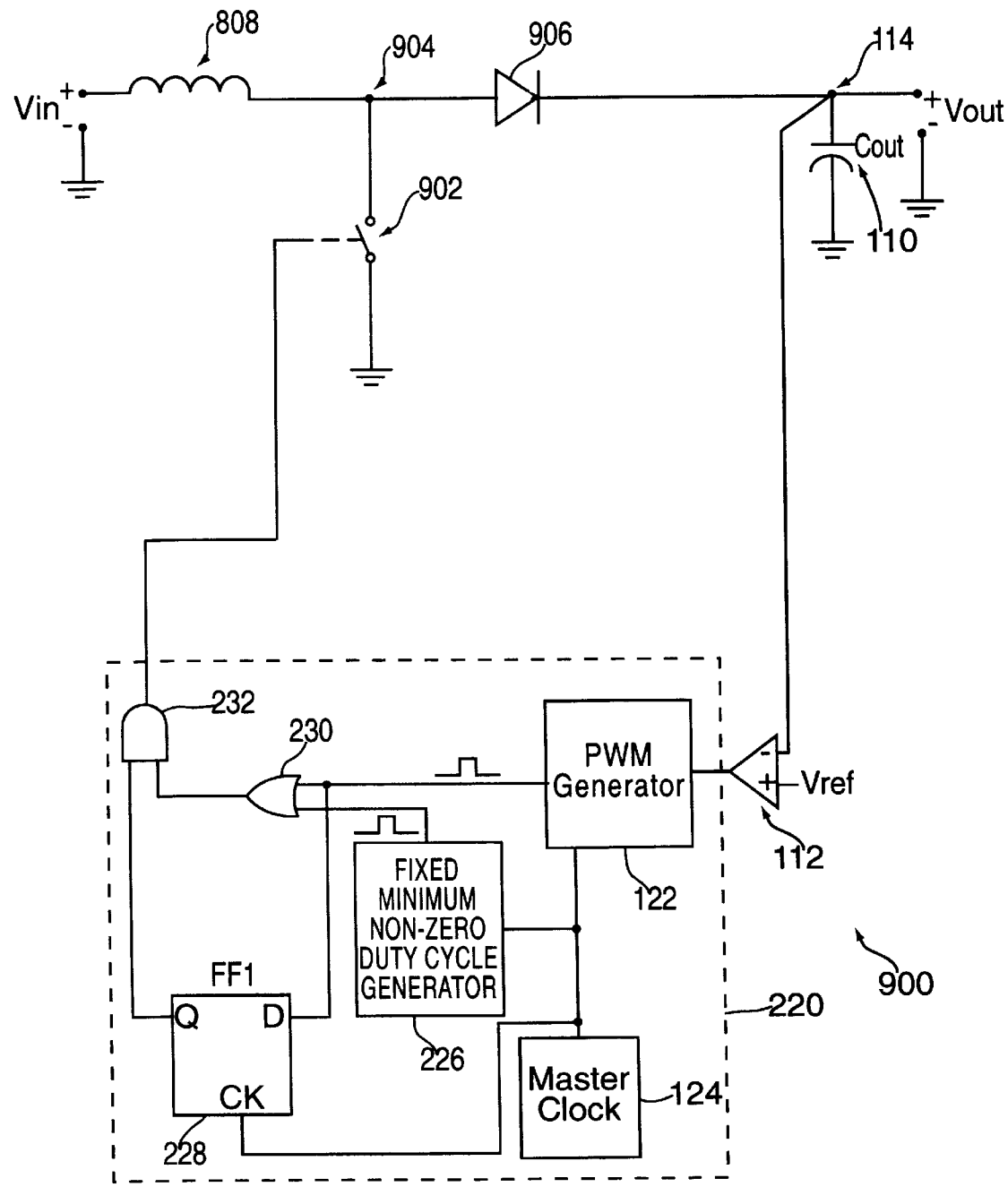
FIG. 9 is a block diagram of a non-synchronous step-up voltage-mode feedback burst mode circuit according to the present invention.

FIG. 9 shows a non-synchronous step-up switching regulator constructed according to the principles of the invention. The circuitry necessary for synchronous operation has been removed and replaced with diode 906 connected between input node 904 and output node 114. First power switch 902 serves substantially the same purpose as first power switch 802 in FIG. 8.

Thus it is seen that voltage-mode switching regulator circuits capable of automatic entrance and exit from burst mode, have been provided. The switching regulator can be designed for both step-down and step-up configurations. Persons skilled in the art will appreciate that the present invention can be practiced by other than the described embodiments, which are presented for purposes of illustration rather than of limitation, and the present invention is limited only by the claims which follow.

What is claimed is:

1. A non-synchronous voltage-mode switching regulator having an input and an output, said switching regulator being capable of automatically entering and exiting burst mode, said switching regulator comprising:

a switch circuit having a duty cycle;

a pulse-width modulator (PWM) circuit having a PWM generator, an independent fixed minimum non-zero duty cycle generator, an input and an output, said PWM circuit output coupled to said switch circuit said switching regulator entering and exiting burst mode based on signals provided by said PWM circuit; and a feedback circuit coupled between said switching regulator output and said PWM generator input that provides a feedback signal to said PWM circuit that is derived from the voltage at said switching regulator output.

2. The switching regulator defined in claim 1 wherein said switch circuit comprises:

a switching element having a first end and a second end, said first end coupled to said switching regulator input;

an inductor coupled between said second end of said switching element and said switching regulator output;

a diode coupled between said second end of said switching element and ground; and an output capacitor coupled between said switching regulator output and ground.

3. The switching regulator defined in claim 1 wherein said PWM generator comprises a first input coupled to said feedback circuit, a second input, and an output, said fixed minimum non-zero duty cycle generator comprises an input and an output, and said PWM circuit further comprising:

a master clock having a first output coupled to said second input of said PWM generator, a second output coupled to said fixed minimum non-zero duty cycle generator input, and a third output;

a logic circuit having a first input coupled to said PWM generator output, a second input coupled to said fixed minimum non-zero duty cycle generator output, a third input coupled to said master clock third output, and an output coupled to said switch circuit.

4. The switching regulator defined in claim 3 wherein said logic circuit comprises:

a burst flip-flop having a D-input coupled to said PWM generator output, a clock input coupled to said third clock output and a Q-output;

an OR gate having a first input coupled to said PWM generator output, a second input coupled to said fixed minimum non-zero duty cycle generator output, and an output; and an AND gate having a first input coupled to said OR gate output, a second input coupled to said Q-output of said burst flip-flop, and an output coupled to said switch circuit such that said AND gate sets said duty cycle for said switch circuit.

5. The switching regulator defined in claim 1 wherein said feedback circuit comprises a feedback amplifier having a positive terminal coupled to a reference voltage, a negative terminal coupled to said switching regulator output, and an output terminal coupled to said PWM circuit input.

6. A synchronous voltage-mode switching regulator having an input and an output, said switching regulator being capable of automatically entering and exiting burst mode comprising:

a switch circuit having a first duty cycle and a second duty cycle, said second duty cycle substantially out-of-phase with said first duty cycle;

a pulse-width modulator (PWM) circuit having a PWM generator, an independent fixed minimum non-zero duty cycle generator, an input and an output, said PWM circuit output coupled to said switch circuit said switching regulator entering and exiting burst mode based on signals provided by said PWM circuit; and a feedback circuit coupled between said switching regulator output and said PWM circuit input that provides a feedback signal to said PWM circuit that is derived from the voltage at said switching regulator output.

7. The switching regulator defined in claim 6 wherein said switch circuit comprises:

a first switching element having a first end and a second end, said first end coupled to said switching regulator input, said first switching element being connected to said PWM circuit such that said first switching element opens and closes in response to said first duty cycle as supplied by said PWM circuit;

an inductor coupled between said second end of said first switching element and said switching regulator output;

a second switching element coupled between said PWM circuit output and said second end of said first switching element, said second switching element opening and closing partially in response to said second duty cycle; and an output capacitor coupled between said switching regulator output and ground.

8. The switching regulator defined in claim 7 wherein said second switching element comprises:

a comparator having a negative terminal, a positive terminal, and an output terminal, said positive terminal coupled to said second end of said first switching element, said negative terminal coupled to ground;

a rising edge detector having an input connected to said comparator output terminal and an output;

an RS-latch flip-flop having an R-input, an S-input and a Q-output, said S-input coupled to said rising edge detector output, said R-input coupled to said PWM circuit output; and a NOR gate having a first input, a second input and an output, said first input connected to said PWM circuit output, said second input connected to said Q-output of said RS-latch flip-flop, and said NOR gate output connected to said second switching element, such that said NOR gate provides said duty cycle for said second switching element.

9. The switching regulator defined in claim 7 wherein said second switching element comprises:

a resistive element, coupled between said second end of said second switching element and ground;

a comparator having a negative terminal, a positive terminal, and an output terminal, said positive terminal coupled to said first end of said first switching element, said negative terminal coupled to ground;

a rising edge detector having an input connected to said comparator output terminal and an output;

an RS-latch flip-flop having an R-input, an S-input and a Q-output, said S-input coupled to said rising edge detector output, said R-input coupled to said PWM circuit output; and a NOR gate having a first input, a second input and an output, said first input connected to said PWM circuit output, said second input connected to said Q-output of said RS-latch flip-flop, and said NOR gate output connected to said second switching element, such that the output of said NOR gate opens and closes said second switching element.

10. The switching regulator defined in claim 7 wherein said second switching element comprises:

a resistive element, coupled between said second end of said second switching element and ground;

a comparator having a negative terminal, a positive terminal, and an output terminal, said positive terminal coupled to said second end of said second switching element, said negative terminal coupled to ground;

a rising edge detector having an input connected to said comparator output terminal and an output;

an RS-latch flip-flop having an R-input, an S-input and a Q-output, said S-input coupled to said rising edge detector output, said R-input coupled to said PWM circuit output; and a NOR gate having a first input, a second input and an output, said first input connected to said PWM circuit output, said second input connected to said Q-output of said RS-latch flip-flop, and said NOR gate output connected to said second switching element, such that the output of said NOR gate opens and closes said second switching element.

11. The switching regulator defined in claim 6 wherein said PWM generator comprises a first input coupled to said feedback circuit, a second input, and an output, said fixed minimum non-zero duty cycle generator comprises an input and an output, and said PWM circuit further comprises:

a fixed minimum non-zero duty cycle generator having an input and an output;

a master clock having a first output coupled to said second input of said PWM generator, a second output coupled to said fixed minimum non-zero duty cycle generator input, and a third output coupled to said clock input of said burst flip-flop;

a logic circuit having a first input coupled to said PWM generator output, a second input coupled to said fixed minimum non-zero duty cycle generator output, a third input coupled to said master clock third output, and an output coupled to said switch circuit.

12. The switching regulator defined in claim 11 wherein said logic circuit comprises:

a burst flip-flop having a D-input coupled to said PWM generator output, a clock input and a Q-output;

a master clock having a first output coupled to said second input of said PWM generator, a second output coupled to said fixed minimum non-zero duty cycle generator input, and a third output coupled to said clock input of said burst flip-flop;

an OR gate having a first input coupled to said PWM generator output, a second input coupled to said fixed minimum non-zero duty cycle generator output, and an output; and an AND gate having a first input coupled to said OR gate output, a second input coupled to said Q-output of said burst flip-flop, and an output coupled to said switch circuit.

13. The switching regulator defined in claim 6 wherein said feedback circuit comprises a feedback amplifier having a positive terminal coupled to a reference voltage, a negative terminal coupled to said switching regulator output, and an output terminal coupled to said PWM circuit.

14. A non-synchronous step-up voltage mode switching regulator having an input and an output, said switching regulator being capable of automatically entering and exiting burst mode, said switching regulator comprising:

a switch circuit having a duty cycle;

a pulse-width modulator (PWM) circuit having a PWM generator, an independent fixed minimum non-zero duty cycle generator, an input and an output, said PWM circuit output coupled to said switch circuit, said duty cycle being set by said PWM circuit, said switching regulator entering and exiting burst mode based on signals provided by said PWM circuit; and a feedback circuit coupled between said switching regulator output and said PWM circuit input that provides a feedback signal to said PWM circuit that corresponds to the voltage at said switching regulator output.

15. The switching regulator defined in claim 14 wherein said switch circuit comprises:

an inductor having a first end and a second end, said first end coupled to said switching regulator input;

a switching element coupled between said second end of said inductor and ground;

a diode coupled between said second end of said inductor and said switching regulator output; and an output capacitor coupled between said switching regulator output and ground.

16. The switching regulator defined in claim 14 wherein said PWM generator comprises a first input coupled to said feedback circuit, a second input, and an output, said fixed minimum non-zero duty cycle generator comprises an input and an output, and said PWM circuit further comprising:

a master clock having a first output coupled to said second input of said PWM generator, a second output coupled to said fixed minimum non-zero duty cycle generator input, and a third output;

a logic circuit having a first input coupled to said PWM generator output, a second input coupled to said fixed minimum non-zero duty cycle generator output, a third input coupled to said master clock third output, and an output coupled to said switch circuit.

17. The switching regulator defined in claim 16 wherein said logic circuit comprises:

a burst flip-flop having a D-input coupled to said PWM generator output, a clock input coupled to said third clock output and a Q-output;

an OR gate having a first input coupled to said PWM generator output, a second input coupled to said fixed minimum non-zero duty cycle generator output, and an output; and an AND gate having a first input coupled to said OR gate output, a second input coupled to said Q-output of said burst flip-flop, and an output coupled to said switch circuit such that said AND gate sets said first duty cycle for said switch circuit.

18. The switching regulator defined in claim 14 wherein said feedback circuit comprises a feedback amplifier having a positive terminal coupled to a reference voltage, a negative terminal coupled to said switching regulator output, and an output terminal coupled to said PWM circuit input.

19. A synchronous step-up voltage mode switching regulator having an input and an output, said switching regulator being capable of automatically entering and exiting burst mode, said switching regulator comprising:

an inductor having a first end and a second end, said first end connected to said switching regulator input;

a first power switch, having a first duty cycle, said first power switch coupled between said second end of said inductor and ground;

a second power switch, having a first end coupled to said second end of said inductor and a second end coupled to said switching regulator output, said second power switch having a second duty cycle, a comparator having a positive terminal coupled to said switching regulator output, a negative terminal coupled to said second end of said inductor, and an output;

a rising edge detector having an input connected to said comparator output terminal and an output;

a latch flip-flop having an R-input, an S-input and a Q-output, said S-input coupled to said rising edge detector output, said R-input coupled to said PWM circuit output; and a NOR gate having a first input coupled to said Q-output of said latch flip-flop, a second input and an output connected to said second power switch such that said NOR gate provides second duty cycle for said second power switch;

a capacitor coupled between said switching regulator output and ground;

a feedback amplifier having a positive terminal coupled to a reference voltage, a negative terminal coupled to said switching regulator output, and an output terminal;

a PWM generator having a first input coupled to said output terminal of said feedback amplifier, a second input, and an output;

a fixed minimum non-zero duty cycle generator having an input and an output;

a burst flip-flop having a D-input coupled to said PWM generator output, a clock input and a Q-output;

a master clock having a first output coupled to said second input of said PWM generator, a second output coupled to said fixed minimum non-zero duty cycle generator input, and a third output coupled to said clock input of said burst flip-flop;

an OR gate having a first input coupled to said PWM generator output, a second input coupled to said fixed minimum non-zero duty cycle generator output, and an output; and an AND gate having a first input coupled to said OR gate output, a second input coupled to said Q-output of said burst flip-flop, and an output coupled to said R-input of said latch flip-flop and coupled to said second input of said NOR gate, and connected to said first power switch such that said AND gate sets said duty cycle for said switch circuit.

20. A non-synchronous voltage-mode switching regulator having an input and an output, said switching regulator being capable of automatically entering and exiting burst mode, said switching regulator comprising:

a switch circuit having a duty cycle;

a pulse-width modulator (PWM) circuit having a PWM generator, an independent fixed minimum non-zero duty cycle generator, an input and an output, said PWM circuit output coupled to said switch circuit, said duty cycle being set by said PWM circuit, said switching regulator entering and exiting burst mode based on signals provided by said PWM circuit; and a feedback circuit coupled between said switching regulator output and said PWM generator input that provides a feedback signal to said PWM circuit that is derived from the voltage at said switching regulator output, wherein said feedback signal is for setting said duty cycle, and, at light load conditions, said independent duty cycle generator provides a minimum signal to said PWM circuit, maintaining said duty cycle at a level higher than that set by said feedback circuit, until said feedback sets a zero duty cycle, at which point said switching regulator enters burst mode.

21. A synchronous voltage-mode switching regulator having an input and an output, said switching regulator being capable of automatically entering and exiting burst mode comprising:

a switch circuit having a first duty cycle and a second duty cycle, said second duty cycle substantially out-of-phase with said first duty cycle;

a pulse-width modulator (PWM) circuit having a PWM generator, an independent fixed minimum non-zero duty cycle generator, an input and an output, said PWM circuit output coupled to said switch circuit, said first duty cycle being set by said PWM circuit and said second duty cycle being partially set by said PWM circuit, said switching regulator entering and exiting burst mode based on signals provided by said PWM circuit; and a feedback circuit coupled between said switching regulator output and said PWM circuit input that provides a feedback signal to said PWM circuit that is derived from the voltage at said switching regulator output, wherein said feedback signal is for setting said first duty cycle, and for partially setting said second duty cycle, and, at light load conditions, said independent duty cycle generator provides a minimum signal to said PWM circuit maintaining said first duty cycle at a level higher than that set by said feedback circuit, until said feedback sets a zero duty cycle, at which point said switching regulator enters burst mode.

22. A non-synchronous step-up voltage mode switching regulator having an input and an output, said switching regulator being capable of automatically entering and exiting burst mode, said switching regulator comprising:

a switch circuit having a duty cycle;

a pulse-width modulator (PWM) circuit having a PWM generator, an independent fixed minimum non-zero duty cycle generator, an input and an output, said PWM circuit output coupled to said switch circuit, said duty cycle being set by said PWM circuit, said switching regulator entering and exiting burst mode based on signals provided by said PWM circuit; and a feedback circuit coupled between said switching regulator output and said PWM circuit input that provides a feedback signal to said PWM circuit that corresponds to the voltage at said switching regulator output, wherein said feedback signal is for setting said duty cycle, and, at light load conditions, said independent duty cycle generator provides a minimum signal to said PWM circuit, maintaining said duty cycle at a level higher than that set by said feedback circuit, until said feedback sets a zero duty cycle, at which point said switching regulator enters burst mode.

* * * * *